United States Patent
Aubin

(10) Patent No.: US 11,845,612 B2
(45) Date of Patent: Dec. 19, 2023

(54) FRICTION DRIVE WHEEL CONSTRUCTION

(71) Applicant: Philip Aubin, Tracy, CA (US)

(72) Inventor: Philip Aubin, Tracy, CA (US)

(*) Notice: Subject to any disclaimer, the term of this patent is extended or adjusted under 35 U.S.C. 154(b) by 0 days.

(21) Appl. No.: 17/549,272

(22) Filed: Dec. 13, 2021

(65) Prior Publication Data

US 2023/0183016 A1   Jun. 15, 2023

(51) Int. Cl.
  *B65G 23/04*  (2006.01)
  *B65G 39/02*  (2006.01)
  *B65G 39/07*  (2006.01)

(52) U.S. Cl.
  CPC ............ *B65G 23/04* (2013.01); *B65G 39/07* (2013.01)

(58) Field of Classification Search
  CPC ......... B65G 23/04; B65G 39/02; B65G 39/07
  USPC ........... 16/45; 198/780, 781.04, 835; 193/37
  See application file for complete search history.

(56) References Cited

U.S. PATENT DOCUMENTS

| | | | | |
|---|---|---|---|---|
| 3,194,293 A * | 7/1965 | Kindley | ............. | B60B 33/0028 16/45 |
| 4,447,932 A * | 5/1984 | Mueller | ............. | B60B 33/0002 16/21 |
| 8,850,658 B2 * | 10/2014 | Dayt | .................... | B60B 33/0042 16/31 R |
| 9,409,723 B2 * | 8/2016 | Seidl | ..................... | B65G 47/256 |
| 9,643,784 B2 * | 5/2017 | Guerra | .................. | B65G 13/07 |
| 10,322,606 B2 * | 6/2019 | Tang | ................... | B60B 33/0042 |
| 11,008,176 B1 * | 5/2021 | Van Kleef | ............. | B65G 39/12 |
| 11,173,825 B2 * | 11/2021 | Nelson | ...................... | B60P 1/48 |

* cited by examiner

*Primary Examiner* — Douglas A Hess
(74) *Attorney, Agent, or Firm* — Howard Cohen

(57) ABSTRACT

A friction drive wheel for conveyor systems includes a cylindrical central disk formed of aluminum. Joined to the curved outer surface of the aluminum disk is a base layer that is cylindrical and sleeve-like and coaxial with the disk. The base layer is formed of a hard polymer (like polyurethane) material, with a hardness in the range of 75 Shore D, to eliminate torsional stress and flexure at the mechanical interface between the base layer and the central disk. A tread layer is secured about the base layer, formed of a softer polymer (like polyurethane) that is more yielding and compliant in contact with the trolley to maximize the frictional engagement. The base layer serves as a thermal insulator between the outer tread layer and the central disk, protecting the bond at the base/central disk interface.

8 Claims, 2 Drawing Sheets

FRICTION DRIVE WHEEL CONSTRUCTION

CROSS-REFERENCE TO RELATED APPLICATIONS

Not applicable.

FEDERALLY SPONSORED RESEARCH

Not applicable.

SEQUENCE LISTING, ETC ON CD

Not applicable.

BACKGROUND OF THE INVENTION

Field of the Invention

This invention relates to friction drive assemblies used in conjunction with conveyor and transport systems, and, more particularly, to an improved construction for friction drive wheels that propel these systems.

Conveyor systems used in automotive assembling and manufacturing processes are generally comprised of a channel-like track that supports at least one trolley supporting a vehicle that is under construction. A track is laid out to extend adjacent to multiple work sites where components are added, painting and other processes are applied, and other assembly tasks are carried out. Typical vehicle manufacturing conveyors generally include a plurality of friction drive units that engage the trolley and translate it along the track. The friction drive unit includes a friction drive wheel that has an outer peripheral surface designed to impinge on a portion of the trolley and propel it along the track.

By custom and by design, friction drive wheels are generally constructed using a metal disk that supports an outer peripheral tread that is adhered to the outer annular surface of the disk. The disk is generally formed of stamped or machined steel or cast iron, and the tread is comprised of a high friction material such as rubber or polymer materials known in the prior art. The tread is secured to the disk utilizing a chemical bond. Due to the need to form a high-friction engagement with the trolley, the friction drive wheels are urged into contact with the trolley using a fairly high force. As a result, the tread portion of the friction drive wheel may undergo compression and expansion during each rotation of the wheel and the tread material is caused to be heated by this constant flexure within the mass of the tread. The heat is conducted to the disk, which experiences an increase in temperature, as does the tread. There is a differential in the thermal expansion coefficient of the tread material and the structural metal portion of the wheel. Thus the tread flexure at elevated temperatures leads to rapid aging of the tread material and spalling, decomposition, and, ultimately, failure. Indeed, the most common reason for failure of the friction drive wheel is heat buildup between the tread and the disk substrate at their chemical bond interface.

When even one friction drive wheel fails, it may result in the entire conveyor line being shut down while the failed drive wheel is replaced. In a well-integrated production or material movement setting, this can cause interruption of the entire enterprise, idling a large amount of equipment due to a simple part failure. Alternatively, the conveyor friction drive wheels may be replaced on a rapid maintenance timetable, but this results in an inordinately high materials cost to keep the lines running.

SUMMARY OF THE INVENTION

The present invention generally comprises an improved construction for a friction drive wheel for conveyor systems. The friction drive wheel is comprised of a central disk formed of aluminum that is cast, stamped, machined, or otherwise formed as a cylindrical disk having opposed planar ends. Joined to the curved outer surface of the aluminum disk is a base layer that is cylindrical and coaxial with the disk. The base layer is formed of a hard polymer (like polyurethane) material, with a hardness in the range of 75 Shore D, to eliminate torsional stress and flexure at the mechanical interface between the base layer and the central disk. Thus a significant source of wheel failure, the differential thermal expansion at the base layer/central disk interface, is diminished. Joined to the base layer is an outer tread layer, also cylindrical and coaxial with the disk. The tread is formed of a somewhat softer polymer (like polyurethane) that is more yielding and compliant in contact with the trolley, to maximize the frictional engagement. The tread layer undergoes flexure (compression and expansion) during each rotation, while the base layer undergoes relatively minor flexural changes during rotation.

It is significant that the outer tread layer is joined to the inner base layer using a molecular bond, which is made possible by the use of the compatible polymer materials of the two layers. The molecular bond between the two polyurethane materials gives the assembly the strongest bond available for torsional and flexural strength. Moreover, the hard polymer base layer insulates its chemical bond at the base/disk interface from the heat created by the flexure of the outer tread at the tread/base interface, eliminating bond failure at the disk interface. The aluminum disk substrate dissipates heat more rapidly than the typical industry-standard steel or cast iron disk and reduces the weight of the assembly by approximately 60%. This reduction creates a much more ergonomical condition for installation and removal of the friction drive wheels.

DETAILED DESCRIPTION OF THE INVENTION

Figure 1:
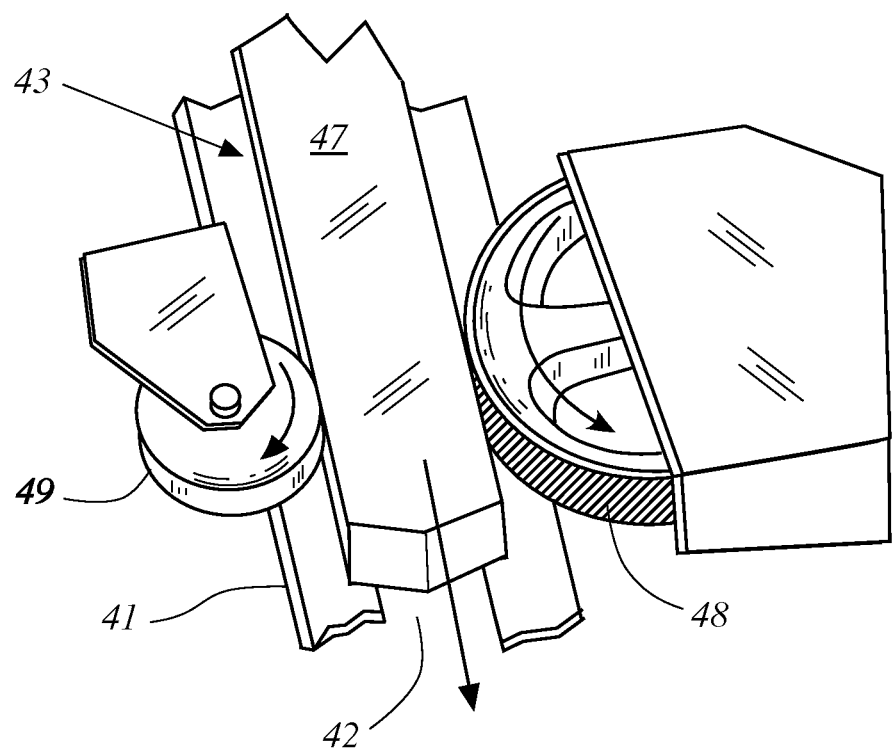
FIG. 1 is a perspective view of a friction drive assembly known in the prior art.

The present invention generally comprises an improved construction for a friction drive wheel for conveyor belt systems that is embodied in the structure and materials of the wheel. With regard to the accompanying FIGS. 1-2, a typical conveyor apparatus known in the prior art for assembling and manufacturing automobiles and other vehicles is generally comprised of a channel 41 that has a track opening 42 extending longitudinally and opening upwardly. At least one trolley 43 is supported on the channel 41 for translation therealong, and includes a wheel assembly 44 to roll along the channel. A riser 46 extends from the wheel assembly upwardly through the track opening 42 and is joined to a trolley body 47 disposed above the channel. A load 50 is supported atop the trolley body 47, which generally comprises a vehicle undergoing assembly and preparation. The track is laid out to extend adjacent to multiple work sites where components are added, painting and other processes are applied, and other construction tasks are carried out.

Figure 2:
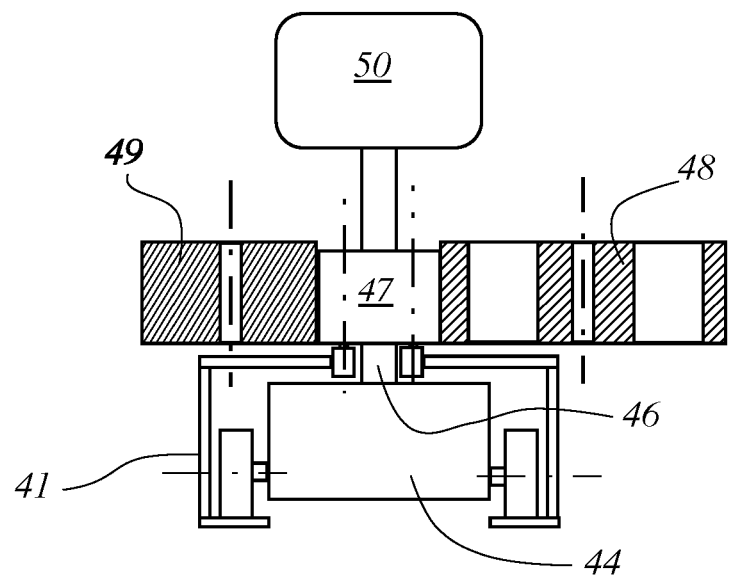
FIG. 2 is a cross-sectional end elevation of the friction drive assembly of FIG. 1.

Typical vehicle manufacturing conveyors generally include a plurality of friction drive units that engage the trolley body 47 and translate it along the track. The friction drive unit includes a friction drive wheel 48 that has an outer peripheral surface designed to impinge on the exterior side surface of the body 47 and propel it along the track. Typically the wheel 48 is cast iron and is provided with a plurality of cast spokes supporting a peripheral cylindrical rim, as shown in FIG. 1. A backing wheel 49 or similar backstop structure is provided to oppose the impinging force of the friction wheel 48.

Figure 3:
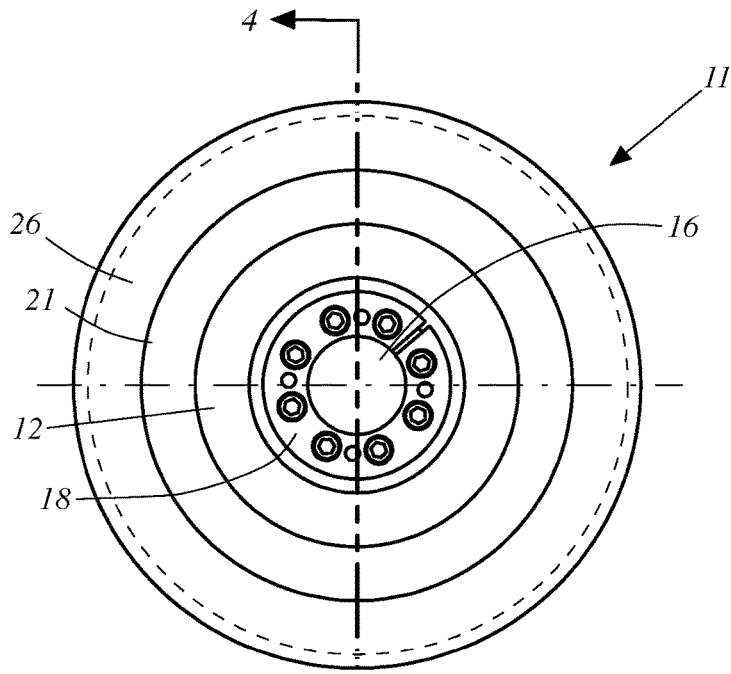
FIG. 3 is a plan view of one end of the friction drive wheel of the present invention.
Figure 4:
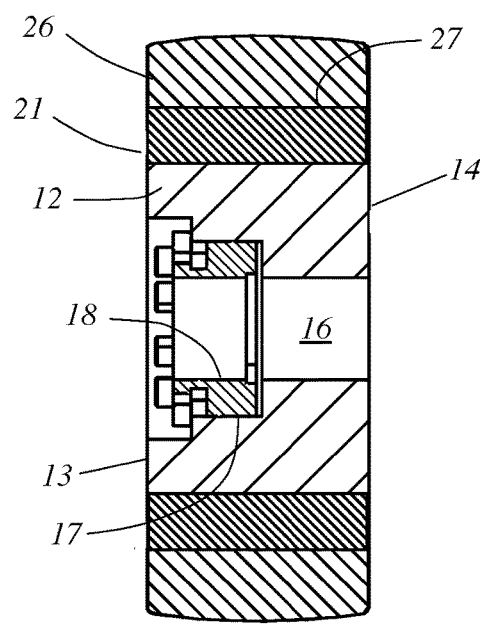
FIG. 4 is a cross-sectional elevation of the friction drive wheel of FIG. 3, taken along line 4-4 of FIG. 3.
Figure 5:
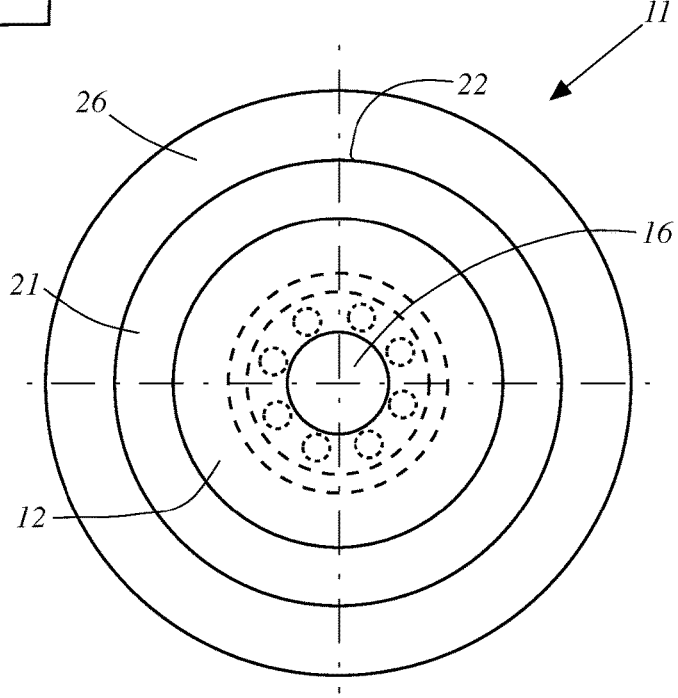
FIG. 5 is a plan view of the other end of the friction drive wheel of the present invention.

Referring to FIGS. 3-5, in the present invention the friction drive wheel 11 is comprised of a central disk 12 that is formed of aluminum that may be cast, stamped, machined, or otherwise formed as a cylindrical disk having opposed planar ends 13 and 14. A bore 16 extends coaxially through the disk 12, and includes a stepped recessed 17 formed coaxially and disposed to secure a bushing 18. The bore 16 and bushing 18 define a coaxial opening in the wheel 11 that is dimensioned to receive and secure the drive shaft of a conveyor propulsion system.

Joined to the curved outer surface of the aluminum disk 12 is a base layer 21 that is cylindrical and coaxial with the disk 12. The base layer 21 is formed of a hard polymer material (such as polyurethane), with a hardness in the range of 75 Shore D, and the hardness of the base layer serves to minimize torsional stress and flexure at the mechanical interface 22 between the base layer 21 and the central disk 12. The rigidity of the base layer 21 thus alleviates a significant source of wheel failure known in the prior art.

Joined to the base layer 21 is an outer tread layer 26, also cylindrical and coaxial with the disk 12. The tread 26 is formed of a somewhat softer polymer (such as polyurethane) having a hardness in the range of 70-95 on the Shore A scale. The tread 26 thus is more yielding and compliant in contact with the trolley 47, to maximize the frictional engagement therewith. The tread layer 26 undergoes flexure (compression and expansion) during each rotation, while the base layer 21 undergoes relatively minor flexural changes during rotation.

It is significant that the outer tread layer 26 is joined to the inner base layer at interface 27 using a molecular bond, which is made possible by the use of compatible polymer materials of the two layers 21 and 26. For example, the layers 21 and 26 may both be formed of polyurethane of substantially identical chemical composition. The molecular bond between the two polyurethane materials gives the assembly the strongest bond available for torsional and flexural strength. Moreover, the hard polymer base layer 21 serves as a thermal insulator, so that its chemical bond with the disk at interface 22 is protected from the heat created by the flexure of the outer tread 26 during loading, eliminating bonding failure at the disk interface 22. Furthermore, the aluminum disk substrate 12 dissipates heat more rapidly than the typical industry-standard steel or cast iron disk, effectively using the drive shaft received within the bore 16 as a heat sink. Moreover, the use of aluminum to form the disk 12 reduces the weight of the overall assembly by approximately 60% compared to the cast iron or steel of the prior art. The lighter weight eases the manual effort involved in maneuvering and securing the drive wheels in their apparatus, and creates a much more ergonomic condition for installation and removal of the friction drive wheels.

While the foregoing description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples but by all embodiments and methods within the scope and spirit of the invention.

The invention claimed is:

1. An improved friction drive wheel construction, including:
    a central disk comprising a cylindrical component having a bore extending axially therethrough;
    a base layer comprising a cylindrical component that is sleeve-like and secured coaxially about said central disk;
    an outer tread layer comprising a cylindrical component that is sleeve-like and secured coaxially about said base layer;
    said central disk being formed of aluminum for high strength and rapid head dissipation;
    said base layer being formed of a hard polymer material that resists flexure and is dimensionally stable;
    said outer tread layer being formed of a resilient polymer material that is adapted to undergo flexure during operational loading;
    said hard polymer material comprising a hard polyurethane formulation;
    said outer tread layer being comprised of a polyurethane formulation that is softer and more resilient that said base layer;
    said outer tread layer and said base layer being joined at mutually confronting annular surfaces by a molecular bond formed between the polyurethane compositions of said outer tread layer and said base layer.

2. The improved friction drive wheel of claim 1, wherein said bore includes a stepped portion adapted to receive a bushing secured therein, said bushing dimensioned to engage a drive shaft of a motor.

3. The improved friction drive wheel of claim 1, wherein said base layer is joined to said central disk by a chemical and mechanical bond.

4. The improved friction drive wheel of claim 3, wherein said base layer serves as a thermal insulator between said outer tread layer and said central disk.

5. The improved friction drive wheel of claim 4, wherein said base layer and said outer tread layer have substantially similar coefficients of thermal expansion.

6. The improved friction drive wheel of claim 5, wherein said central disk is formed of aluminum.

7. The improved friction drive wheel of claim 1, wherein said base layer has a hardness in the range of 75 Shore D.

8. The improved friction drive wheel of claim 7, wherein said outer tread layer has a hardness in the range of 70-95 Shore A.

* * * * *